Nov. 3, 1970 W. R. ISOM 3,537,661

PRESSURE ROLLER CONSTRUCTION

Filed July 17, 1968

INVENTOR

WARREN R. ISOM

BY Eugene M. Whitacre

ATTORNEY

United States Patent Office 3,537,661
Patented Nov. 3, 1970

3,537,661
PRESSURE ROLLER CONSTRUCTION
Warren R. Isom, Indianapolis, Ind., assignor to RCA Corporation, a corporation of Delaware
Filed July 17, 1968, Ser. No. 745,457
Int. Cl. B65h 17/48
U.S. Cl. 242—55.19 6 Claims

ABSTRACT OF THE DISCLOSURE

An all plastic pressure roller construction includes a thin walled tubular rim portion concentric with an inner hub portion. A web portion provides a rigid support coupling between the hub portion and the axial midpoint of the rim portion.

This invention relates to magnetic tape driving means and in particular to a pressure roller used in conjunction with a driven capstan in a magnetic tape player apparatus to propel a tape at a given speed.

In magnetic tape players, the pressure roller is used to hold the tape against a propelling capstan. To do this effectively, the pressure roller must be aligned accurately with the capstan. Misalignment will cause the tape to skew to one side as it is pulled by the capstan. Using economically reasonable manufacturing tolerances and to provide for proper alignment between the capstan and pressure roller, it has heretofore been the practice to fabricate the pressure roller with a surrounding tire of a compliant rubber material. Thus any residual mechanical misalignment is accommodated by the compliant surface of the tire on the roller. However, while the use of a rubber tire pressure roller may minimize tolerance requirements in regard to alignment problems, new problems are introduced in that the concentricity of the tire is difficult to maintain. For example, generally the rubber tire is mounted on a hub and during operation of the pressure roller in a tape player apparatus, the tire may tend to creep around the hub, thereby introducing eccentricities in the pressure roller. Also the compliance or elasticity of the rubber material may change with age. This produces hard spots in the rubber which in turn show up as an effective eccentricity. The tire may also "cold flow" and form a "flat" if left under pressure against the capstan for an extended period of time.

It is an object of the present invention to provide an improved pressure roller construction of economical manufacture and which substantially alleviates the aforementioned problems.

It is another object of the present invention to eliminate the dependence upon a rubber-tired pressure roller to propel magnetic tape in a tape player apparatus.

A pressure roller embodying the present invention is of plastic construction and includes a central hub portion, a tubular outer rim portion concentric with the hub portion and a radially extending web portion connected between the hub portion and the mid section of said rim portion. The wall thickness of the rim portion is sufficiently thin to permit flexure thereof when urged against a capstan in a tape player apparatus, so that the capstan and pressure roller are accurately aligned.

Other objects and advantages of the invention will become apparent from the following description and accompanying drawing wherein.

Figure 1:
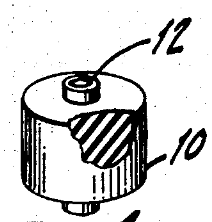
FIG. 1. PRIOR ART
FIG. 1 is a perspective view of a prior art construction pressure roller.

Referring now to the drawing, a pressure roller construction of the type heretofore known is illustrated in FIG. 1 and designated as prior art. This pressure roller includes a tire portion 10 of a rubber material concentrically mounted as by molding or a press fit on a hub portion 12. The attendant disadvantages of such a pressure roller construction have been heretofore discussed.

Figure 2:
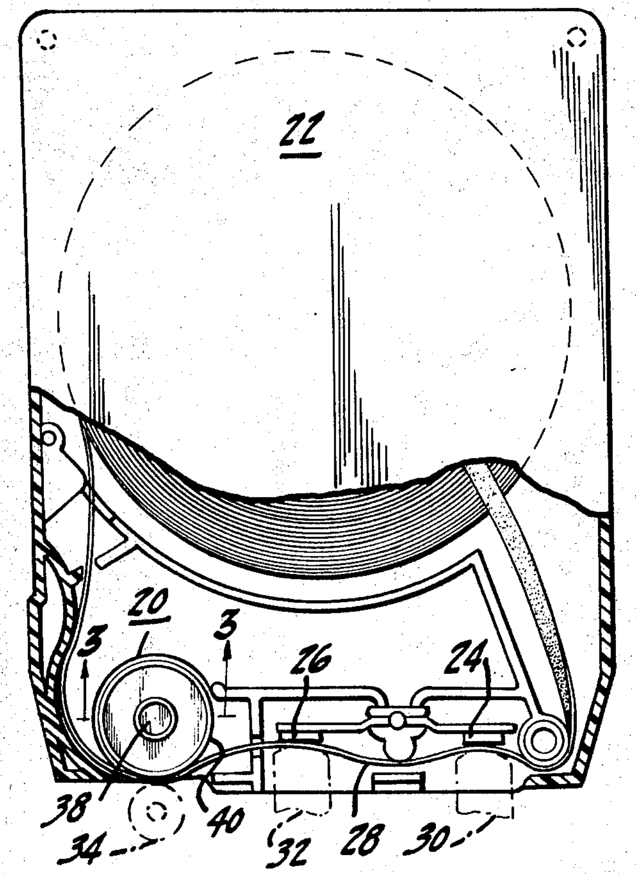
FIG. 2 is a plan view partially broken away of an endless loop tape cartridge embodying the pressure roller of the present invention.
Figure 3:
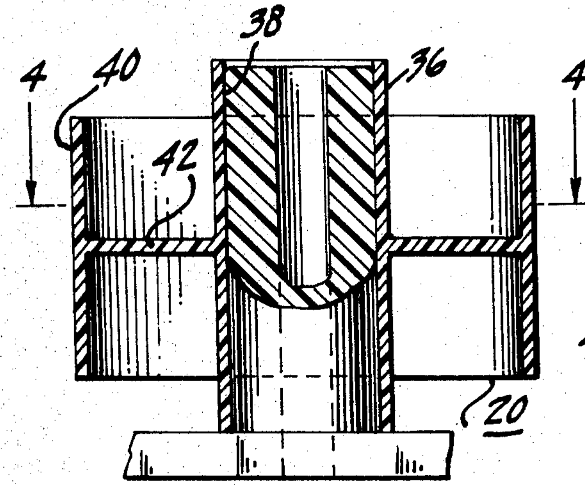
FIG. 3 is an enlarged sectional view in elevation of the pressure roller taken on line 3—3 of FIG. 2.
Figure 4:
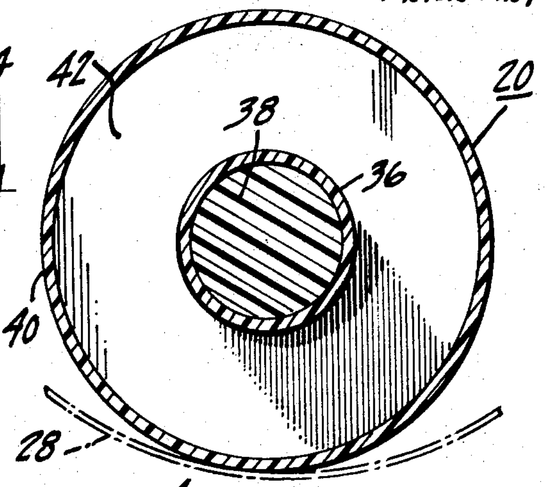
FIG. 4 is a sectional view of the pressure roller taken on line 4—4 of FIG. 3.

Referring now particularly to FIGS. 2, 3 and 4, a pressure roller 20 constructed in accordance with the present invention is shown in an endless loop tape cartridge 22. The cartridge 22 is of the type wherein during operation thereof, a pair of padded arms 24 and 26 effect a resilient engagement of an exposed portion of a magnetic tape 28 with a sensing head 30 and a record head 32 associated with a player apparatus (not shown), while the roller 20 presses the tape 28 against a driven capstan 34, also included in the player apparatus (not shown), to frictionally draw the tape 28 from right to left across the front portion of the cartridge 22. It will be understood, however, that the pressure roller of the invention is equally applicable for use with other types of magnetic tape player apparatus and systems as for example, reel to reel players including those adapted to use with "cassette" type cartridges.

Referring particularly now, to FIGS. 3 and 4, the pressure roller 20 of the present invention is preferably of a unitary construction and includes a hub portion 36 having a centrally disposed bore or aperture 38 extending therethrough so as to provide a bearing means for rotatably mounting the pressure roller 20 in, for example, the cartridge 22. Concentric with and surrounding the hub portion 36 is a rim or tubular outer portion 40. The rim 40 is spaced from and supportedly connected to the hub 36 by a rigid web portion 42 extending radially outward from the hub portion 36 and terminating at the axial midpoint of the rim portion 40. The pressure roller is preferably fabricated of plastic material of the type classified as polyformaldehyde, examples of which are marketed under the trade names of Delrin and nylon. Compliance of the rim portion is obtained by maintaining its thickness at substantially thirty thousandths of an inch. At this thickness, the rim is flexible, yet is sufficiently rigid to urge the tape 28 into engagement with the drive captan 34. The flexible quality of the rim 40, permits it to align itself properly with the capstan during operation thereof. The web portion 42 is preferably of substantially the same thickness as the rim portion 40 but in acting radially provides from the axial center of the hub a rigid support of the rim 40 at its axial midpoint.

It will be noted that in the construction of an all plastic pressure roller, preferably by precise molding techniques, and as above described, a very high order of concentricity and uniformity is obtained. Since, the plastic from which the roller is molded is stable, once the pressure roller is molded it retains its shape without change due to aging. The problem of flat spots is also eliminated. Thus an improved pressure roller has been provided that is simple to manufacture, low in cost, and the performance of which remains constant without regard to age or usage.

What is claimed is:

1. A pressure roller of the type adapted to be coupled to a driven capstan in a magnetic tape player apparatus comprising:

a hub portion having means centrally disposed therein for rotatably mounting said pressure roller;

a tubular portion concentric with and overlying said hub portion and having an outer wall surface adapted to be drivingly coupled to said capstan; and a web portion extending radially outward from said hub portion and terminating at the midpoint of said tubular portion, said hub, tubular and web portions being formed as an integral unit, the wall thickness of said tubular portion being substantially equal to the thickness of said web portion such that said web portion provides a rigid support coupling between said tubular and hub portions and said tubular portion provides a flexible coupling with said capstan.

2. A pressure roller as defined in claim 1 and being formed in a one piece construction of polyformaldehyde.

3. In an endless loop tape cartridge of the type including a rotatably mounted annular hub member containing a roll of tape spirally wound therearound and wherein during operation of the cartridge, the hub and roll of tape are rotated and the innermost convolution of the tape is drawn out from around the hub and passed across the forward portion of the cartridge for cooperative engagement with an external transducing means, a pressure roller of the type adapted to be coupled to a driven capstan in a magnetic tape player comprising:

a hub portion having means centrally disposed therein for rotatably mounting said pressure roller;

a tubular portion concentric with and overlying said hub portion and having an outer wall surface adapted to be drivingly coupled to said capstan;

a web portion extending radially outward from said hub portion and terminating at the midpoint of said tubular portion, said hub, tubular and web portions being formed as an integral unit, the wall thickness of said tubular portion being of a thickness such that said web portion provides a rigid support coupling between said tubular and hub portions, and said tubular portion being of a thickness such that said tubular portion provides a flexible coupling with said capstan; and said roller positioned within the cartridge forward portion adjacent a cartridge aperture in operative engagement with said tape.

4. A pressure roller as defined in claim 3 wherein the thickness of said web portion is substantially equal to the thickness of said tubular portion.

5. A pressure roller as defined in claim 3 wherein said hub portion, said tubular portion and said web portion are formed of polyformaldehydes.

6. A pressure roller as defined in claim 5 wherein the wall thickness of said tubular portion is substantially equal to thirty-thousandths of an inch.

References Cited

UNITED STATES PATENTS

| | | | |
|---|---|---|---|
| 2,263,439 | 11/1941 | Hansen | 226—190 X |
| 3,446,410 | 5/1969 | Brose | 226—191 |

ALLEN N. KNOWLES, Primary Examiner

U.S. Cl. X.R.

226—191, 194